(12) United States Patent
Chan et al.

(10) Patent No.: US 12,015,440 B2
(45) Date of Patent: Jun. 18, 2024

(54) CHIP-SCALE RECEIVER AND METHOD FOR FREE SPACE OPTICAL COHERENT COMMUNICATIONS

(71) Applicant: OAM Photonics LLC, Albuquerque, NM (US)

(72) Inventors: Kam Wai Clifford Chan, San Diego, CA (US); Chung Ki Wong, San Diego, CA (US)

(73) Assignee: OAM Photonics LLC, Albuquerque, NM (US)

( * ) Notice: Subject to any disclaimer, the term of this patent is extended or adjusted under 35 U.S.C. 154(b) by 56 days.

(21) Appl. No.: 18/048,779

(22) Filed: Oct. 21, 2022

(65) Prior Publication Data

US 2023/0126802 A1    Apr. 27, 2023

Related U.S. Application Data

(60) Provisional application No. 63/271,116, filed on Oct. 22, 2021.

(51) Int. Cl.
*H04B 10/112* (2013.01)
*H04B 10/61* (2013.01)

(52) U.S. Cl.
CPC .......... *H04B 10/112* (2013.01); *H04B 10/61* (2013.01)

(58) Field of Classification Search
CPC .... H04B 10/112; H04B 10/61; H04B 10/616; H04B 10/69
USPC .......................................................... 398/129
See application file for complete search history.

(56) References Cited

U.S. PATENT DOCUMENTS

| | | | |
|---|---|---|---|
| 7,006,732 B2 | 2/2006 | Gunn, III et al. | |
| 9,316,534 B1* | 4/2016 | Kondratko | G01S 17/08 |
| 9,709,668 B1* | 7/2017 | Kondratko | G01S 17/08 |
| 11,402,802 B2 | 8/2022 | Chan et al. | |
| 2022/0011409 A1* | 1/2022 | Hosseini | G01S 17/58 |
| 2022/0050201 A1* | 2/2022 | Sun | G02B 27/283 |
| 2022/0357429 A1* | 11/2022 | Seok | G01S 17/42 |
| 2023/0087712 A1* | 3/2023 | Blanchette | G02B 17/061 |

OTHER PUBLICATIONS

M. Strauch, "Wide-angle spectral imaging using a Fabry-Perot interferometer," J. Eur. Opt. Soc.-Rapid 10, 15037 (2015).
T. Grulois et al., "Extra-thin infrared camera for low-cost surveillance applications," Opt. Lett. 39, 3169 (2014).
S.-W. Moon et al., "Recent Progress on Ultrathin Metalenses for Flat Optics," iScience 23, 101877 (2020).
J. Engelberg et al., "The advantages of metalenses over diffractive lenses," Nat. Commun. 11, 1991 (2020).
W. R. Leeb, "Degradation of signal to noise ratio in optical free space data links due to background illumination," Appl. Opt. 28, 3443 (1989).

(Continued)

*Primary Examiner* — Abbas H Alagheband
(74) *Attorney, Agent, or Firm* — Patterson + Sheridan, LLP

(57) ABSTRACT

The present disclosure relates to a chips-scale free-space optical (FSO) receiver with a wide two-dimensional field-of-view (FOV) that affords high data rate optical communication and rapid pointing and tracking (PAT) operations in an integrated design, and a method for FSO communication with PAT that supports high-speed node acquisition and network entry, and simple angle of arrival calculations.

20 Claims, 9 Drawing Sheets

(56) References Cited

OTHER PUBLICATIONS

E. Agrell et al., "Information-Theoretic Tools for Optical Communications Engineers," 31st Annual Conference of the IEEE Photonics Society, IPC 2018 (2018).

Spector, Steven J. "Review of lens-assisted beam steering methods." Journal of Optical Microsystems 2.1 (2022): 011003.

L. Zimmermann, K. Voigt, G. Winzer, K. Petermann and C. M. Weinert, "C-Band Optical 90°-Hybrids Based on Silicon-on-Insulator 4 × 4 Waveguide Couplers," in IEEE Photonics Technology Letters, vol. 21, No. 3, pp. 143-145, Feb. 1, 2009, doi: 10.1109/LPT.2008.2009317.

* cited by examiner

| Pixel size | Number of pixels | Angular resolution (45° FOV) | Chip area of receiver array |
|---|---|---|---|
| 40×45 μm² | 128×128 | 0.352°×0.352° | 5.12×5.76 mm² |
| 40×45 μm² | 192×192 | 0.234°×0.234° | 7.68×8.64 mm² |
| 30×30 μm² | 256×256 | 0.176°×0.176° | 7.68×7.68 mm² |
| 25×25 μm² | 256×256 | 0.176°×0.176° | 6.4×6.4 mm² |

FIG. 9A

| Parameter | Value | Parameter | Value |
|---|---|---|---|
| Transmitted signal power ($P_S$) | 20 mW | Photodetector responsivity | 1 A/W |
| Receiver coupling efficiency ($\eta_R$) | 20% | Photodetector dark current | 10 nA |
| Atmospheric attenuation ($\alpha$) | 0.2 dB/km | Photodetector multiplication | 1 |
| Wavelength | 1550 nm | Detector excess noise factor | 1 |
| Receiver pixel array size | 128×128 | Optical filter bandwidth | 2 nm |
| LO power | 10 μW | Electrical bandwidth (B) | 1 GHz |
| Amplifier noise | 1 pA/√Hz | | |

FIG. 9B

CHIP-SCALE RECEIVER AND METHOD FOR FREE SPACE OPTICAL COHERENT COMMUNICATIONS

RELATED APPLICATION

This application claims the benefit of priority to U.S. Provisional Application No. 63/271,116, filed Oct. 22, 2021, the entire contents of which are incorporated herein by reference for all purposes.

TECHNICAL FIELD

The present disclosure relates to a chips-scale free-space optical (FSO) device for optical communication with pointing and tracking (PAT) capabilities, and a method for FSO communication with PAT.

BACKGROUND

The increasing demand for data bandwidth in wireless communications has pushed the utilization of radio frequency (RF) spectrum to the limit. Additionally, RF wireless communications present a real challenge to security due to their high probability of detection, interception, and interference resulting from wide area propagation of RF signals. Free space optical (FSO) communication is able to eliminate these problems—the optical band provides large bandwidths for high data rate communication, and the nature of narrow laser beam and point-to-point transmission prevents interception and interference without physically blocking the beam. Current FSO systems nevertheless are bulky, heavy, and costly. Additionally, when one or more of the communication parties is in motion, these systems require some pointing and tracking (PAT) mechanism, such as by means of a CMOS camera for tracking and a mirror for pointing, to maintain an optimal communication link. The PAT system is usually separate from the communication system. For highly-mobile military and potential civilian applications that demand large quantity deployments, there is a need for a low size, weight, power and cost (SWAP-C) solution. Photonic integrated circuit (PIC) technology is able to provide the infrastructure for ultra-low SWAP FSO designs by integrating thousands of optical components into a tiny chip and offering optoelectronic techniques for extremely rapid laser beam-steering that replace mechanical steering in conventional systems. CMOS-compatible silicon photonics is also promising to significantly bring down product cost through economies of scale.

Chip-scale FSO components have been fabricated and demonstrated at various levels of maturity with increasing performances in field-of-view (FOV), angular resolution, and scanning speed of the laser beam. Nevertheless, current state-of-the-art designs, noticeably optical phased array (OPA)-based system, focus on the transmitter of the FSO system, while relatively little attention has been paid to receiver designs. More critically, these transmitter designs are primarily targeted for light detection and ranging (LiDAR) applications and cannot simply be adopted for receivers for FSO communications without significant design modifications.

SUMMARY

The present disclosure provides a chip-scale free-space optical (FSO) receiver implemented on a photonic integrated circuit (PIC) that enables high data rate optical communication and rapid pointing and tracking (PAT) with a wide two-dimensional field of view in an integrated design switchable between coherent detection mode and direct detection mode. The present disclosure also provides a method for FSO communication with PAT that supports high-speed node acquisition and network entry, and simple angle of arrival calculations, through the use of dual modes of coherent detection and direct detection.

In one aspect, the present disclosure provides a receiver for free-space optical communication configured to operate between coherent and direct detection modes, comprising a local oscillator light source configured to generate a local oscillator signal, an optical routing network coupling to the local oscillator light source, a receiver pixel array coupling to the optical routing network, wherein the receiver pixel array comprises a plurality of receiver pixels, each of the receiver pixels comprises: a free-space-to-waveguide optical antenna, an optical coupler with one of its input ports coupling to the free-space-to-waveguide optical antenna, at least two photodetectors coupling to output ports of the optical coupler, and a pixel electronic circuit configured to receive and process electrical outputs from the photodetectors, and a signal readout electronic circuit configured to switch the pixel electronic circuits in receiver pixels of the receiver pixel array between coherent detection mode and direct detection mode, and to receive electrical readout signals from the pixel electronic circuits; wherein, in operation, the receiver pixel array is configured to select one or more receiver pixels to receive an optical signal from free space through one or more free-space-to-waveguide optical antennas of the selected receiver pixels; wherein when the receiver is configured to operate in the coherent detection mode, the optical routing network is configured to route the local oscillator signal from the local oscillator light source to the selected receiver pixels of the receiver pixel array; the selected receiver pixels are configured to couple the local oscillator signal into the pixels; optical couplers of the selected receiver pixel mix the local oscillator signal and the received optical signal; the optical couplers split the mixed local oscillator and received optical signals; the split signals are detected by photodetectors coupling to the optical couplers in the selected receiver pixels; pixel electronic circuits of the selected receiver pixels are switched to operate in the coherent detection mode by the signal readout electronic circuit to receive and process electrical outputs from the photodetectors; and the pixel electronic circuits output electrical readout signals to the signal readout electronic circuit; and wherein when the receiver is configured to operate in the direct detection mode, the selected receiver pixels are configured to decouple from the local oscillator signal; optical couplers of the selected receiver pixels split the received optical signal without mixing with the local oscillator signal due to the absence of the local oscillator signal in the selected receiver pixels; the split received optical signals are detected by photodetectors coupling to the optical couplers in the selected receiver pixels; pixel electronic circuits of the selected receiver pixels are switched to operate in the direct detection mode by the signal readout electronic circuit to receive and process electrical outputs from the photodetectors; and the pixel electronic circuits output electrical readout signals to the signal readout electronic circuit.

In one embodiment, the pixel electronic circuit switched to operate in the coherent detection mode processes electrical outputs from the photodetectors by taking a difference of the electrical outputs to produce the electrical readout signal.

In one embodiment, the pixel electronic circuit switched to operate in the direct detection mode processes electrical outputs from the photodetectors by taking a sum of the electrical outputs to produce the electrical readout signal.

In one embodiment, the receiver further comprises a control electronic circuit configured to control the routing of the local oscillator signal in the optical routing network.

In one embodiment, when the receiver is configured to operate in the direct detection mode, the selected receiver pixels are configured to decouple from the local oscillator signal by configuring the optical routing network to route the local oscillator signal away from the selected receiver pixels of the receiver pixel array.

In one embodiment, the receiver pixel array of the receiver further comprises a plurality of optical switches, and the receiver pixel array is partitioned into a plurality of groups of receiver pixels comprising one or more receiver pixels, with each group of receiver pixels configured to couple the local oscillator signal into receiver pixels of the group through one of the optical switches.

In one embodiment, two or more groups of receiver pixels are configured to share a common waveguide to receive the local oscillator signal from the optical routing network.

In one embodiment, each group of receiver pixels further comprises a plurality of readout channels, such that each receiver pixel in each group is configured to output electrical readout signal to the signal readout electronic circuit independently of other receiver pixels in the group through a readout channel of the plurality of readout channels.

In one embodiment, the receiver pixel array is partitioned into a plurality of clusters of groups of receiver pixels, wherein each cluster comprises two or more groups of receiver pixels, with the groups of the cluster configured to share the plurality of readout channels to multiplex electrical readout signals from the groups such that, at any moment, receiver pixels of only one of the groups of receiver pixels of the cluster are configured to output electrical readout signals to the signal readout electronic circuit through the shared readout channels.

In another aspect, the present disclosure provides a device for free-space optical communication comprising the receiver of the present disclosure and an optical imaging system coupling with the receiver pixel array of the receiver.

In one embodiment, the device for free-space optical communication further comprises a micro-lens array coupling with the optical imaging system and the receiver pixel array.

In still another aspect, the present disclosure provides a method for free-space optical communication switchable between coherent detection mode and direct detection mode, comprising: generating a local oscillator signal from a local oscillator light source; selecting a plurality of receiver pixels from a receiver pixel array; receiving an optical signal from free space by at least one receiver pixel in the selected plurality of receiver pixels; in the coherent detection mode, performing the steps of routing the local oscillator signal to the selected plurality of receiver pixels through an optical routing network; coupling the local oscillator signal into the selected plurality of receiver pixels; mixing the local oscillator signal and the optical signal in the selected receiver pixel that receives the optical signal; splitting the mixed local oscillator and optical signals; detecting the split signals by photodetectors; switching a pixel electronic circuit of the selected receiver pixel to coherent detection mode; processing electrical outputs from the photodetectors by the pixel electronic circuit to produce an electrical readout signal; and outputting the electrical readout signal to a signal readout electronic circuit; and in the direct detection mode, performing the steps of decoupling the local oscillator signal from the selected plurality of receiver pixels; splitting the optical signal without mixing with the local oscillator signal due to the absence of the local oscillator signal in the selected receiver pixel that receives the optical signal; detecting the split optical signals by photodetectors; switching a pixel electronic circuit of the selected receiver pixel to direct detection mode; processing electrical outputs from the photodetectors by the pixel electronic circuit to produce an electrical readout signal; and outputting the electrical readout signal to a signal readout electronic circuit.

In one embodiment, in the coherent detection mode, processing electrical outputs from the photodetectors comprises taking a difference of the electrical outputs to produce the electrical readout signal.

In one embodiment, in the direct detection mode, processing electrical outputs from the photodetectors comprises taking a sum of the electrical outputs to produce the electrical readout signal.

In one embodiment, in the direct detection mode, decoupling the local oscillator signal comprises configuring an optical routing network to route the local oscillator signal away from the selected plurality of receiver pixels.

In one embodiment, receiving an optical signal from free space comprises collecting the optical signal through an optical imaging system.

In one embodiment, the method further comprises calculating an angle of arrival of the optical signal according to a location of the selected receiver pixel that receives the optical signal with respect to a field of view of the optical imaging system.

In one embodiment, the method further comprises tracking a change of the angle of arrival of the optical signal.

In one embodiment, the method further comprises maintaining the receiver pixel that receives the optical signal to lie within a group of inner pixels of the selected plurality of receiver pixels.

In one embodiment, the method further comprises updating the selected plurality of receiver pixels to maintain the receiver pixel that receives the optical signal to lie within a group of inner pixels of the selected plurality of receiver pixels.

BRIEF DESCRIPTION OF THE DRAWINGS

The skilled artisan will understand that the drawings are primarily for illustrative purposes and are not intended to limit the scope of the disclosed subject matter. The drawings are not necessarily to scale; in some instances, various aspects of the disclosed subject matter may be shown exaggerated or enlarged in the drawings to facilitate an understanding of different features.

FIG. 9A shows a table that illustrates examples of achievable angular resolution and chip area for the receiver pixel array of the present disclosure. FIG. 9B shows a table that illustrates example parameters for link budget analysis.

DETAILED DESCRIPTION

The following detailed description includes systems, methods, techniques, and instruction sequences that illustrate embodiments of the present disclosure. In the following description, for the purposes of explanation, numerous specific details are set forth in order to provide an understanding of various embodiments of the present disclosure. It will be evident, however, to those skilled in the art, that embodiments of the present disclosure may be practiced with or without these specific details. In general, instruction instances, protocols, structures, and techniques well-known to those skilled in the art are not necessarily shown in detail.

Figure 1A:
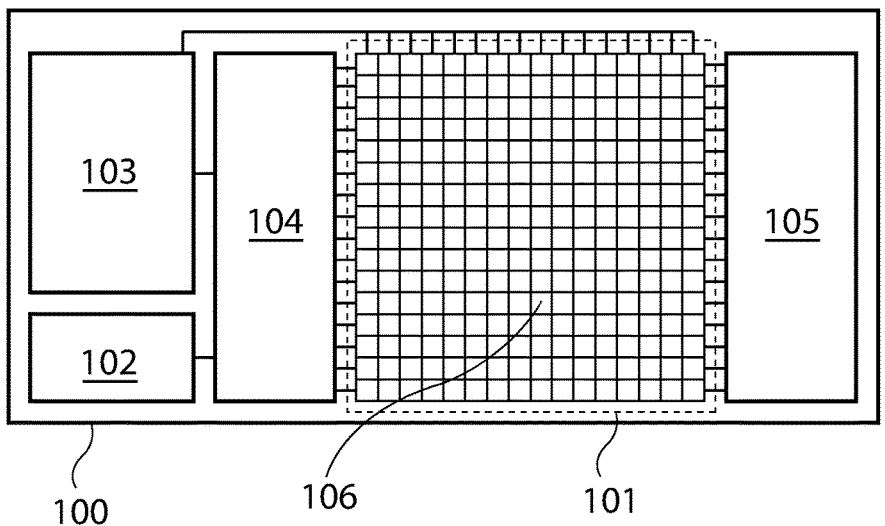
FIG. 1A shows the schematic of a receiver for free space optical communication, in accordance with an embodiment of the present disclosure.

Certain embodiments leverage the PIC technology that may provide a potentially low SWAP-C FSO solution integrating communication and PAT functionalities.
Configuration of Device FIG. 1A illustrates the schematic of receiver 100 for FSO communication. Receiver 100 may operate in coherent optical detection mode and in direct optical detection mode. It achieves rapid tracking by means of a multi-pixel focal plane array in which each pixel of the receiver may also exhibit as a high bandwidth detector for communication.

In receiver 100, an array 101 of receiver pixels 106 includes optical antennas that are implemented on a photonic chip based on photonic integrated circuit (PIC) technology. FIG. 1C illustrates an embodiment of receiver pixel 106 in receiver pixel array 101 of receiver 100. A more detailed description of receiver pixel 106 is given at a later part of the present disclosure. In FIG. 1A, Local oscillator (LO) signal from an on-chip or external narrow-linewidth (<hundreds of kHz) laser source 102 may be routed to receiver pixel array 101 through optical routing network 104. According to some embodiments, optical routing network 104 may take the form of a binary tree of optical waveguides with Mach-Zehnder Modulator (MZM)-based photonic switches at the tree nodes for low-loss operations. Receiver 100 may include control electronics 103 that control the routing of the LO signal in optical routing network 104 and receiver pixel array 101. Receiver 100 may also include signal readout electronics 105 that control the operation mode of receiver pixel array 101 and receive electrical readout signals from receiver pixel array 101. Receiver pixel array 101, control electronics 103, optical routing network 104, and signal readout electronics 105 may be implemented on a single chip or on separate chips. Additionally, receiver 100 may include components or connect to components, including but not limited to any of electronics, controllers, computers, etc., not shown in FIG. 1A that may control the operations of laser source 102, control electronics 103, and signal readout electronics 105.

Figure 1C:
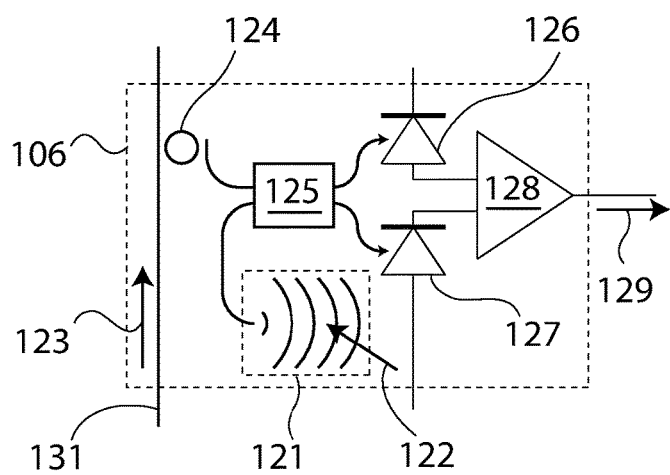
FIG. 1C illustrates an embodiment of a receiver pixel.
Figure 2A:
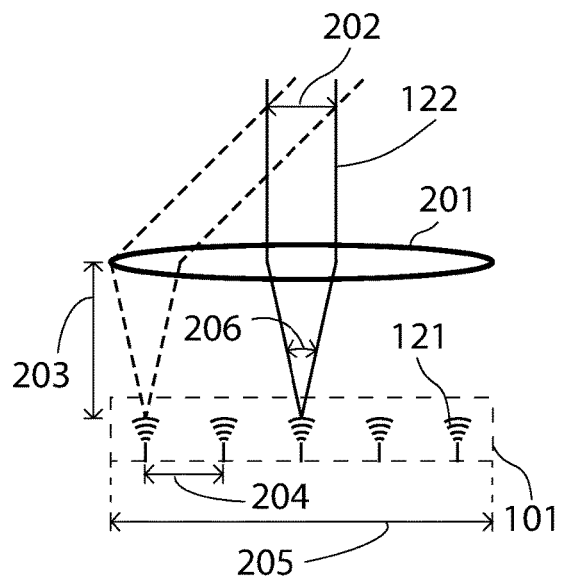
FIG. 2A illustrates an embodiment of a configuration of the receiver of the present disclosure to operate with an optical imaging system.

Receiver 100 may operate with optical imaging system 201 as illustrated in FIG. 2A. With reference to FIGS. 1C and 2A, optical signal 122 may be coupled from free space to receiver pixel array 101 through optical antenna 121 of receiver pixel 106 with the use of free-space optical imaging system 201. As described previously, receiver 100 may operate in coherent optical detection mode and in direct optical detection mode. In coherent optical detection mode, the in-coupled optical signal is mixed with LO signal 123 and measured by a pair of photodetectors 126 and 127 in the photonic chip, according to the embodiment of receiver pixel 106 in FIG. 1C. In direct optical detection mode, the in-coupled optical signal is measured by one or both of the photodetectors 126 and 127 without being mixed with LO signal 123, according to the embodiment of receiver pixel 106 in FIG. 1C. More details about the operations of receiver pixel 106 in the operations of receiver 100 are given at a later part of the present disclosure.

Similar to a CMOS image sensor in a camera, according to FIG. 2A, each pixel of receiver 100 may correspond to a different angular field of view (FOV) when receiver 100 operates with optical imaging system 201. In FIG. 2A, optical imaging system 201 may include any combination of bulk optics and flat lens. The FOV of receiver 100 is related to parameters including, but not limited to, the effective focal length 203 of free-space optical imaging system 201 and lateral size 205 of receiver pixel array 101. Very wide reception angle (e.g., in the order of $2\pi$ steradian) may be achieved with the use of an optical imaging system including compact fisheye lens or other methods. The lateral (angular) resolution of receiver 100 is related to parameters including, but not limited to, the number of optical antennas in receiver pixel array 101, which is highly scalable (e.g., megapixel) and may allow high-throughput multiplexed parallel readouts. The number of optical antennas in receiver pixel array 101 are related to the pitch 204 of optical antennas 121, the size of receiver pixel 106, and the lateral size 205 of receiver pixel array 101. Examples of achievable angular resolution and chip area for the receiver pixel array are given in FIG. 9A. It should be understood that other angular resolution, chip area, pixel size, and number of pixels for the receiver pixel array may also be attainable. The exit pupil 202 of optical imaging system 201 gives rise to angular subtension 206 of the incoming optical signal 122 to optical antenna 121.

Figure 2B:
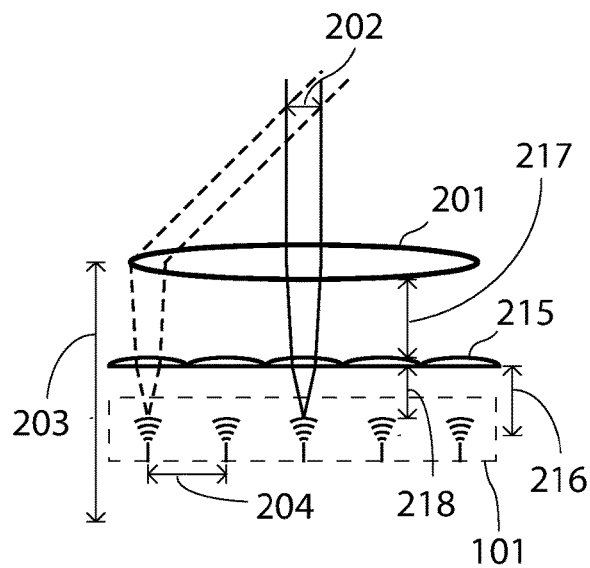
FIG. 2B illustrates an embodiment of the use of a micro-lens array with the receiver of the present disclosure and an optical imaging system.
Figure 2C:
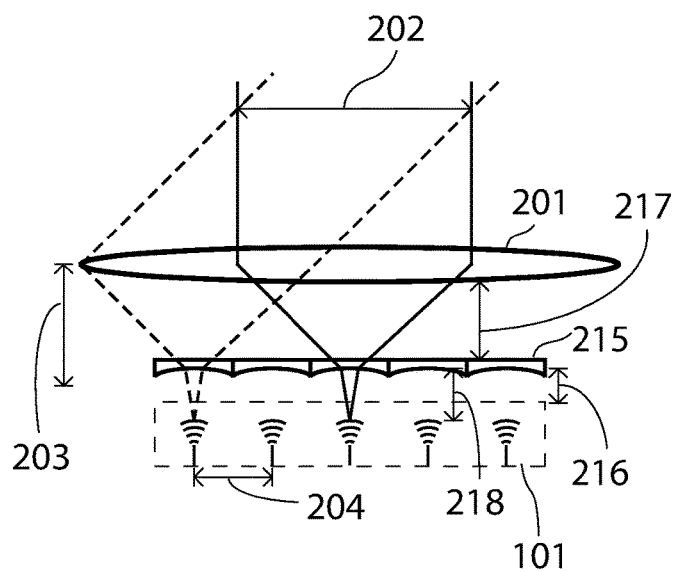
FIG. 2C illustrates another embodiment of the use of a micro-lens array with the receiver of the present disclosure and an optical imaging system.

According to some embodiments, as illustrated in FIG. 2B, a micro-lens array 215 with focal length of 216 may be placed between receiver pixel array 101 and optical imaging system 201 to increase the pixel fill-factor and optimize the coupling of light to the optical antennas by matching angular subtension 206 on a pixel of the receiver pixel array with the optimal acceptance angle of optical antenna 121. The distance 217 between the back surface of optical imaging system 201 and micro-lens array 215, and the distance 218 between micro-lens array 215 and optical antenna 121 are related to focal lengths of optical imaging system 201 and micro-lens array 215. FIG. 2C illustrates another embodiment of the use of micro-lens array 215.

Receiver 100 may enable the direct detection mode and the coherent detection mode at each pixel of the receiver pixel array. Coherent detection has advantageous features including higher sensitivity and resilience to ambient light as compared to direct detection, and allows the use of high-order modulation formats for communication, such as but not limited to 4-QAM and 16-QAM (Quadrature Amplitude Modulation), to increase spectral efficiency. The coherent detection mode may be used for FSO communication when the counterparty of communication is tracked. On the other hand, direct detection mode, which does not need mixing with the LO (and hence the switching and routing of the LO), may be utilized for rapid target localization before a communication link with the counterparty is established. In direct detection mode, receiver 100 plays a role similar to a CMOS image sensor in a conventional PAT system.

Figure 1B:
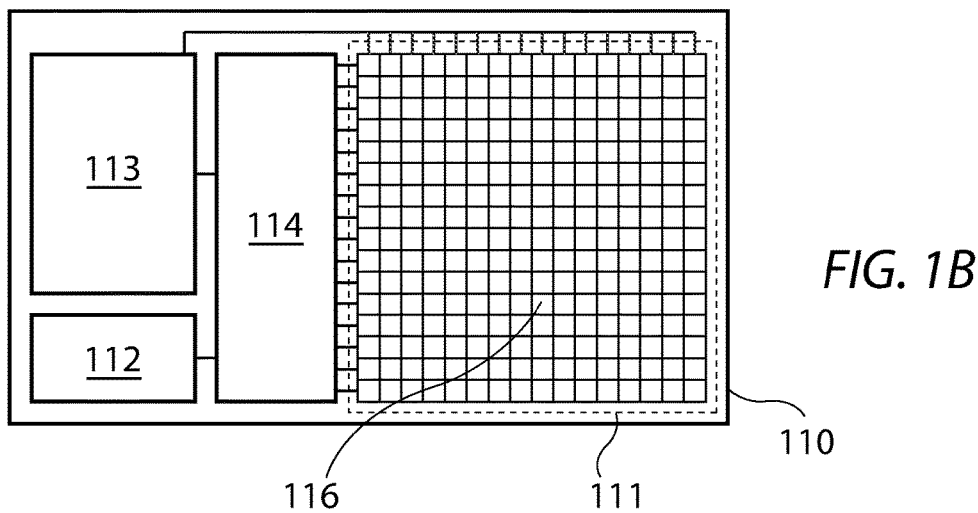
FIG. 1B shows the schematic of a transmitter for free space optical communication, in accordance with an embodiment of the present disclosure.

FIG. 1B shows the schematic of transmitter 110. Similar to receiver 100, transmitter 110 achieves rapid pointing by means of a multi-pixel array in which each pixel of transmitter 110 exhibits as a light source for free-space optical signal transmission. In FIG. 1B, optical signal from on-chip or external laser source 112 is routed to transmitter pixel array 111 through optical routing network 114. According to some embodiments, optical routing network 114 may take the form of a binary tree of optical waveguides with Mach-Zehnder Modulator (MZM)-based photonic switches at the tree nodes for low-loss operations. Transmitter 110 may include control electronics 113 that control the routing of the optical signal in optical routing network 114 and transmitter pixel array 111. Transmitter pixel array 111, control electronics 113, and optical routing network 114 may be implemented on a photonic chip or on separate chips. Similar to receiver 100, transmitter 110 may operate with optical imaging system 201 as illustrated in FIG. 2A for beam-steering, e.g., pointing a laser beam of optical signal to the communication counterparty.

Figure 1D:
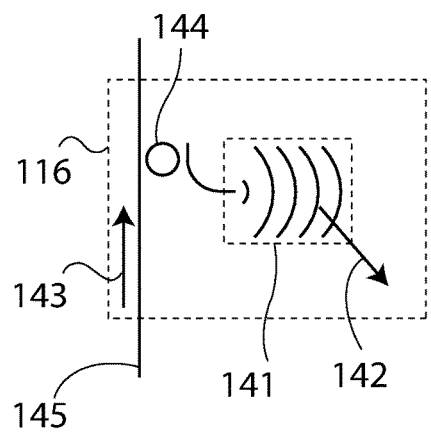
FIG. 1D illustrates an embodiment of a transmitter pixel.

A difference between receiver 100 and transmitter 110 is that transmitter 110 includes a simpler design of the pixels for signal transmission. FIG. 1D illustrates an embodiment of a transmitter pixel 116 of transmitter pixel array 111 in transmitter 110. Transmitter pixel 116 includes optical switch 144 that couples optical signal 143 from waveguide 145 to the pixel, and optical antenna 141 that out-couples optical signal 143 to free space as optical signal 142. Examples of optical switch 144 may include, but are not limited to, a micro-ring resonator optical switch. According to some embodiments of transmitter pixel 116 as illustrated in FIG. 1D, an optical switch 144 may couple optical signal 143 to one optical antenna 141. According to other embodiments of transmitter pixel 116, an optical switch 144 may couple optical signal 143 to more than one optical antennas 141 in the pixel.

Transmitter 110 may be implemented on the same or different chip as receiver 100. For beam-steering of optical signal 142, transmitter 110 is based on the same beam-steering mechanism as a lens-assisted integrated 2D beam-steering device for light detection and ranging. In addition to a lens-assisted transmitter 110, receiver 100 may operate with any beam-steering transmitter including but not limited to optical phased array (OPA) and MEMS-mirror based transmitter. However, for applications of high data-rate FSO communication with high-speed PAT, receiver 100 may work with a transmitter that does not rely on wavelength tuning for beam-steering like that in OPA, so that a narrow spectral bandpass filter may be utilized to reduce noises from ambient light sources.

Pixel and Pixel Array

According to some embodiments as exemplified in FIG. 1C, a receiver pixel 106 of receiver pixel array 101 in receiver 100 may include optical antenna (e.g., free-space-to-waveguide optical coupler) 121, 2×2 optical coupler 125, photodetectors 126 and 127, and other photonic and electronic components to route and process optical and electrical signals, including but not limited to optical switch 124 and pixel electronic circuit 128. Examples of optical switch 124 may include, but are not limited to, a micro-ring resonator optical switch. Optical signal 122 is coupled from free space to receiver pixel 106 through optical antenna 121.

Receiver pixel 106 may operate, through pixel electronic circuit 128 controlled by signal readout electronics 105 of receiver 100, in either (i) coherent detection mode in which receiver pixel 106 may output electrical readout signal 129 that is proportional to the product of the electric fields of optical signal 122 and LO signal 123, or (ii) direct detection mode in which receiver pixel 106 may output electrical readout signal 129 that is proportional to the power of optical signal 122.

In the coherent detection mode of operation, LO signal 123 is coupled from waveguide 131 to receiver pixel 106 through optical switch 124. The coupling of LO signal 123 through optical switch 124 is controlled by control electronics 103 of receiver 100. 2×2 optical coupler 125 mixes optical signal 122 and LO signal 123, and splits the mixed signals into photodetectors 126 and 127. 2×2 optical coupler 125 with photodetectors 126 and 127 perform balanced heterodyne detection of optical signal 122 with LO signal 123. Pixel electronic circuit 128 is controlled by signal readout electronics 105 of receiver 100 to process and amplify the electrical outputs of photodetectors 126 and 127, and to output electrical readout signal 129. According to some embodiments, electrical readout signal 129 for the coherent detection mode may be proportional to the product of the electric fields of optical signal 122 and LO signal 123. According to some embodiments, the product may be produced by taking a difference of the electrical outputs of photodetectors 126 and 127. Electrical readout signal 129 is output by receiver pixel 106 and received by signal readout electronics 105 of receiver 100.

In the direct detection mode of operation, LO signal 123 is not coupled to receiver pixel 106. This may be accomplished by either one or both of processes (i) and (ii), where process (i) involves routing LO signal 123 away from receiver pixel 106 through optical routing network 104 controlled by control electronics 103, and process (ii) involves decoupling receiver pixel 106 from waveguide 131 through optical switch 124 controlled by control electronics 103 so that LO signal 123, if present, may pass through waveguide 131 without coupling to receiver pixel 106. Photodetectors 126 and 127 perform direct detection of optical signal 122 that is split by 2×2 optical coupler 125. Pixel electronic circuit 128 is controlled by signal readout electronics 105 of receiver 100 to process and amplify electrical outputs from either one or both photodetectors 126 and 127. According to some embodiments, electrical readout signal 129 for the direct detection mode may be proportional to the power (electric field squared) of optical signal 122. According to some embodiments, electrical readout signal 129 may be produced by summing the electrical outputs of photodetectors 126 and 127, in the circumstance when outputs from both photodetectors are used. According to other embodiments, electrical readout signal 129 may be produced by using electrical output from one photodetector in the balanced heterodyne detection configuration and shunting the electrical output from the other photodetector. Electrical readout signal 129 is output by receiver pixel 106 and received by signal readout electronics 105 of receiver 100.

According to some embodiments, pixel electronic circuit 128 may compute both the difference and sum of the electrical outputs of photodetectors 126 and 127, and output either one or both of the difference and the sum as one or more electrical readout signals 129 set by signal readout electronics 105 of receiver 100 depending on whether receiver pixel 106 is to be operated in the coherent detection mode or the direct detection mode. According to other embodiments, pixel electronic circuit 128 may output the electrical outputs of photodetectors 126 and 127 as a pair of electrical readout signals 129 to signal readout electronics 105 without performing the differencing or summing operations.

The coherent detection mode may be used for high-speed FSO communication whereas the direct detection mode may be used for rapid initial PAT. FSO communication may operate at a much higher data rate (such as >100 Mbps) than PAT (such as <10 Mbps). A low-noise detector without electrical amplification gain may be preferable for coherent detection, whereas the signal-to-noise for direct detection may be made up with a longer measurement time to compensate for a low gain photodetector. The disclosed embodiments thus afford to utilize unity-gain PIN photodiodes for the photodetectors of receiver pixel 106 for both the coherent and direct detection modes.

Receiver 100 may have an integrated design of a receiver pixel array with each pixel including a mixer (e.g., 2×2 optical coupler 125) and photodetectors. Additionally, there may be no need to switch the gain of the photodetectors for the different detection modes in receiver 100. Instead, the different detection modes in receiver 100 manifest in the different processing of the electrical outputs from the photodetectors by pixel electronic circuit 128.

According to some embodiments, instead of including 2×2 optical coupler 125 and two photodetectors 126 and 127, receiver pixel 106 may include an optical 90°-hybrid, such as a 4×4 waveguide coupler. According to other embodiments, optical antenna 121 may be a polarization-separating free-space-to-waveguide optical coupler. In such a circumstance, receiver pixel 106 may include two 2×2 optical couplers, or two optical 90°-hybrids, with an appropriate number of photodetectors for the coherent detection of the two polarizations of optical signal 122.

Figure 3:
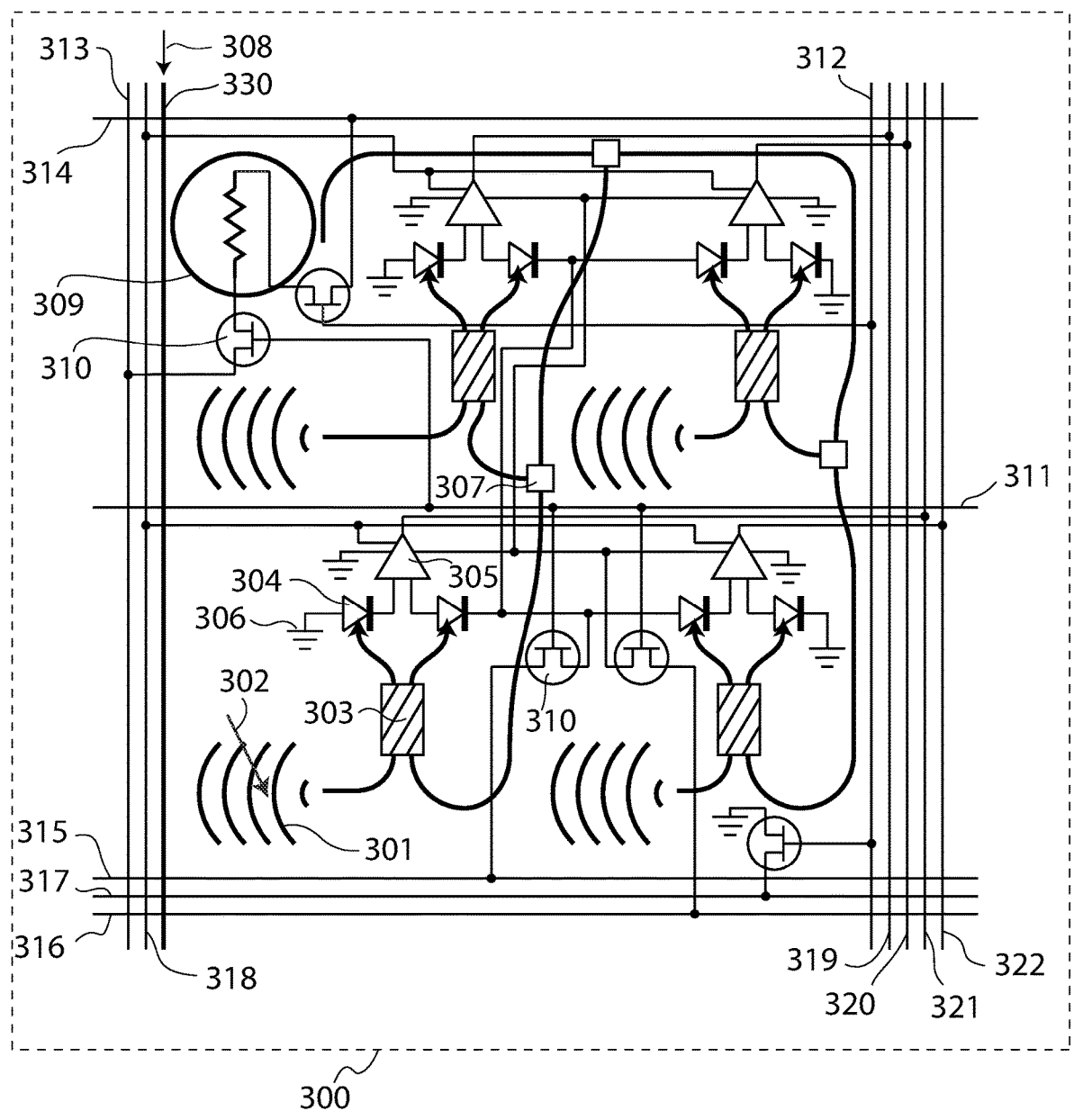
FIG. 3 illustrates an embodiment of a receiver pixel group.
Figure 7:
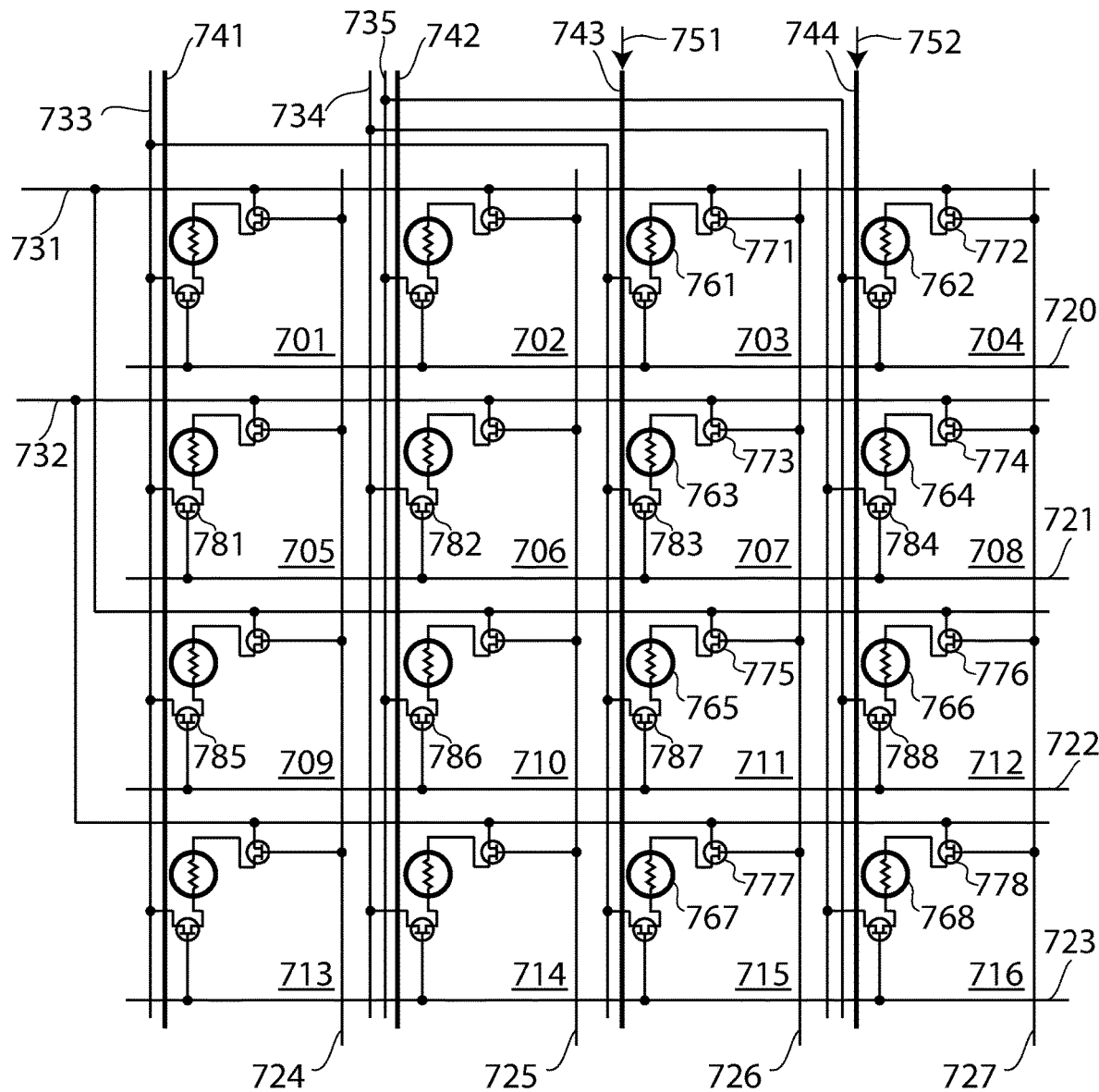
FIG. 7 illustrates an embodiment of a receiver pixel array of the present disclosure that affords rapid tracking with the coherent detection mode of operation.

To achieve high detection and readout throughput, multiple pixels may be grouped to couple with the LO signal, and the in-coupled free-space-to-waveguide optical signals may be output from the group of pixels simultaneously. FIG. 3 illustrates an embodiment of pixel group 300 including 2×2 receiver pixels that share a common LO waveguide 330. In coherent detection mode, LO signal 308 is coupled from LO waveguide 330 to pixel group 300 through optical switch 309. According to some embodiments, optical switch 309 may be a micro-ring resonator optical switch. When LO signal 308 is coupled to pixel group 300, it is split among the four receiver pixels by optical 1×2 splitters 307. The electrical readout signals of the four receiver pixels may be simultaneously output through four readout channels 319, 320, 321 and 322. To establish good electrical isolation, pixel group 300 includes electrical switches 310 that may be controlled through control channels 311 and 312. Components such as optical switch 309, photodetectors 304, and pixel electronic circuits 305 in pixel group 300 may be activated only when ON signals are applied simultaneously to control channels 311 and 312 to switch on electrical switches 310. Here, activation means that electrical power supplies are coupled to these components to make them to operate when electrical switches 310 are set in ON states. When electrical switches 310 are set in OFF states through control channels 311 and 312, these components are decoupled from electrical power supplies so they are not in operation. Control channels 311 and 312 may be used to activate a selected pixel group (e.g., to activate the components in the pixel group) in a receiver array that includes a plurality of pixel groups (c.f. FIG. 7). Control channel 311 functions as a row selector for pixel group 300 and control channel 312 functions as a column selector for pixel group 300. Control channels 311 and 312 are connected to control electronics 103 of receiver 100. Control electronics 103 provide control signals to activate electrical and electro-optical components including optical switch 309, photodetectors 304, and pixel electronic circuits 305 in pixel group 300. Control channel 318 provides the control signal from signal readout electronics 105 of receiver 100 to switch pixel electronic circuits 305 between the coherent detection mode and the direct detection mode.

In operation, while not all pixels (e.g., only one pixel) in pixel group 300 may receive optical signal 302 from the communication counterparty, all pixels in pixel group 300 may be activated to get ready for signal reception. Activating all pixels in a pixel group in the present disclosure may be useful for continuous PAT. The design for pixel group 300 can provide dedicated power supplies for the different components so as to accommodate possible different voltages that may be required by these components. According to the embodiment in FIG. 3, powerlines 313 and 314 may provide voltage for optical switch 309, powerline 315 may provide bias voltages for photodetectors 304, powerline 316 may provide voltages for pixel electronic circuits 305, and powerline 317 may provide the ground connection to the common grounds 306.

The pixel group may include any number of pixels other than 2×2 pixels. The optimal number of pixels in a group may be determined by the available LO power to be distributed to each pixel to attain optimal operation such as, but not limited to, shot-noise limited detection.

Figure 4A:
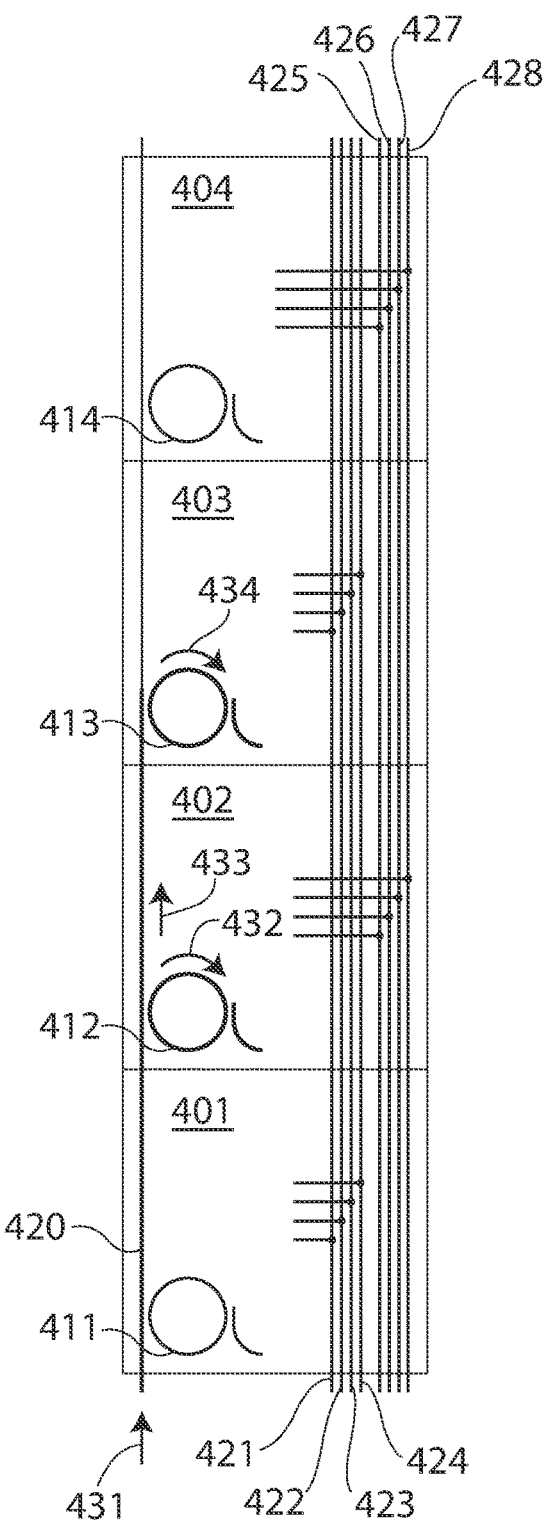
FIG. 4A illustrates an embodiment of a configuration with multiple receiver pixel groups that are joined together.

Pixel groups may be joined together to form a large receiver array of $N_1 \times N_2$ pixels with each of the numbers of LO waveguides and electrical paths scales in either $N_1$ or $N_2$, where the electrical paths may include readout channels, control channels, and powerlines. In joining the pixel groups, depending on the number of pixel groups intended to be activated simultaneously, the signal readouts may be concatenated so as to share a set of common readout channels. FIG. 4A shows an embodiment of four pixel groups 401, 402, 403, and 404 joined in a column that share a common LO waveguide 420. Each of the pixel groups includes four receiver pixels as illustrated in FIG. 3. For illustration simplicity, only optical switches 411, 412, 413 and 414, and readout channels 421, 422, 423, 424, 425, 426, 427 and 428 of the pixel groups are displayed in FIG. 4A. The configuration of the pixel groups in FIG. 4A enables electrical signals from two adjacent pixel groups to be output independently and simultaneously. As an illustration, in FIG. 4A, pixel groups 401 and 403 share common readout channels 421, 422, 423 and 424, and pixel groups 402 and 404 share common readout channels 425, 426, 427 and 428.

Such a design is useful for the disclosed high-speed continuous pointing and tracking mechanism to be described in the following.

Figure 4B:
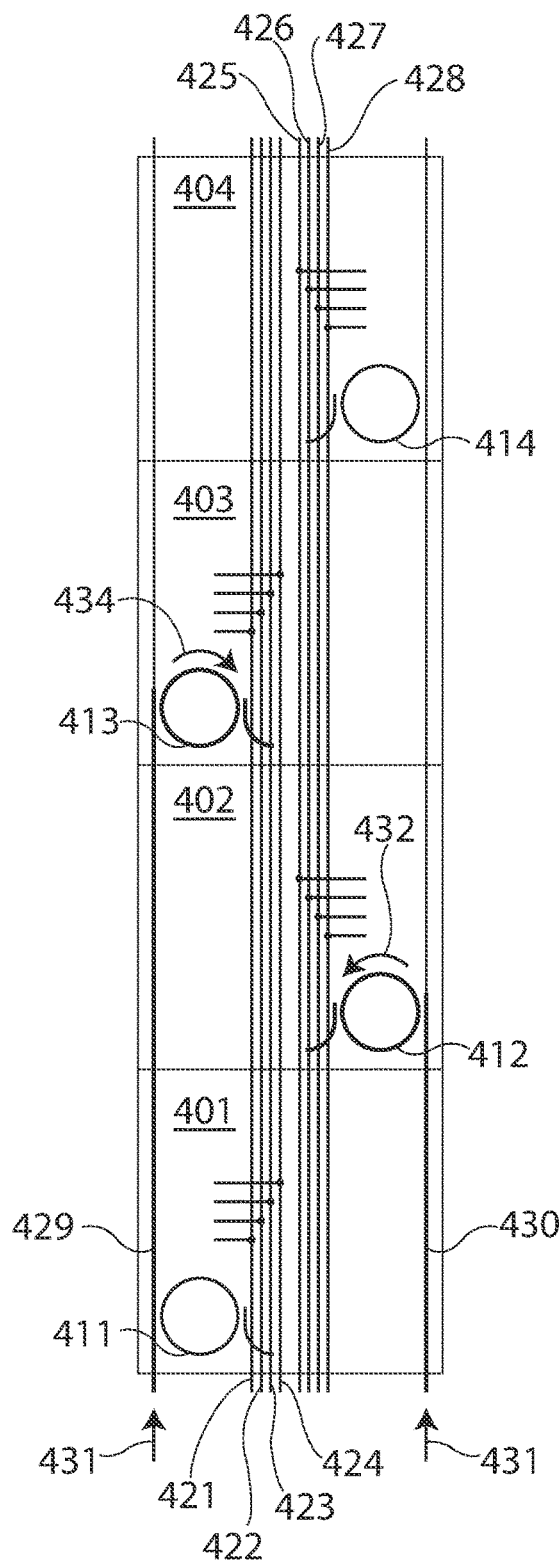
FIG. 4B illustrates another embodiment of a configuration with multiple receiver pixel groups that are joined together.

For the setup in FIG. 4A, in order to activate two pixel groups, the LO signal 431 may be coupled to the two groups simultaneously. According to some embodiments, this may be accomplished by designing the optical switches 411, 412, 413 and 414 in such a way that they can be tuned to couple a fraction of the LO signal to one of the pixel groups and to couple the remaining LO signal to the other pixel group. For example, as illustrated in FIG. 4A, optical switch 412 couples a fraction of LO signal 431 to pixel group 402 as LO signal 432. A remaining fraction of LO signal passes optical switch 412 as LO signal 433. Optical switch 413 then couples LO signal 433 to pixel group 403 as LO signal 434. Pixel group 402 outputs electrical readout signals through readout channels 425, 426, 427 and 428, whereas pixel group 403 outputs electrical readout signals through readout channels 421, 422, 423 and 424. FIG. 4B illustrates an alternative embodiment of a configuration that joins pixel groups using multiple LO waveguides. According to the embodiment in FIG. 4B, pixel groups 401, 402, 403 and 404 are joined with LO waveguides 429 and 430, and optical switches 411, 412, 413 and 414 may be set to couple all or most of LO signals from the waveguides to the respective pixel groups. In FIG. 4B, optical switch 412 couples LO signal 431 in waveguide 430 to pixel group 402 as LO signal 432, whereas optical switch 413 couples LO signal 431 in waveguide 420 to pixel group 403 as LO signal 434.

Free-Space Optical Imaging System

The FOV of receiver 100 is determined by the free-space optical imaging system. There are a wide variety of compact lens designs with FOV including, but not limited to, coverage from 45° to full 360° coverage (c.f. smart phone camera lenses, dash cameras, sports cameras, etc.).

Aperture of the optical imaging system is related to the area of receiver 100 to receive the incident optical signal, whereas (image-side) chief ray angles are related to the coupling efficiency of the incident optical signal to the receiver chip. The aperture size and chief ray angles of the optical imaging system may need to be designed with the receiver chip to attain optimal performances.

The acceptance angle of the free-space-to-waveguide optical antenna in the pixels of receiver 100 is defined by the design of the coupler. Currently, most free-space-to-waveguide optical couplers for communication applications are designed to couple light optimally at an angle from about 6° to 10° measured from the normal of the couplers, though vertical-coupling free-space-to-waveguide optical antenna are also used in communication applications. For the free-space-to-waveguide optical antenna in receiver 100, either vertical coupling or coupling at an angle may be used. For the latter case, an optical device, such as a micro-lens array or a micro-wedge array, may be used to turn normal incident slanted chief rays of the incident light to slanted rays for coupling to the couplers.

Figure 5A:
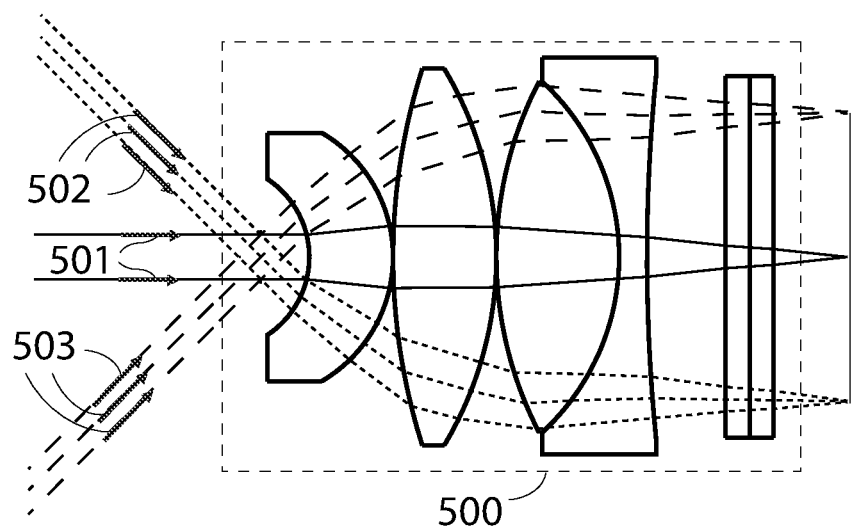
FIG. 5A illustrates an embodiment of an optical imaging system.
Figure 5B:
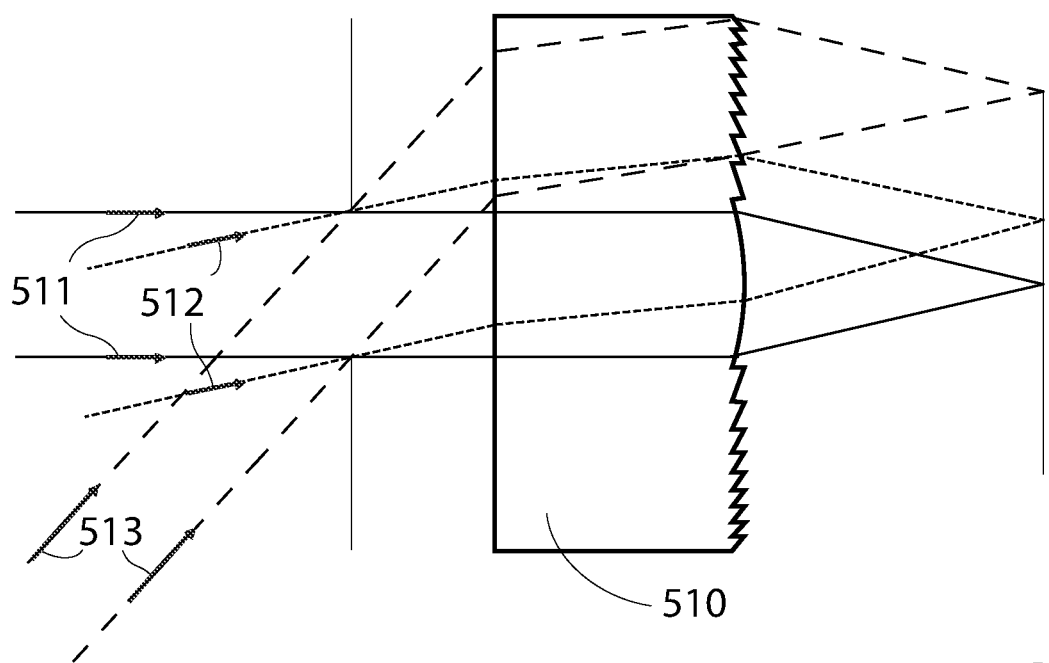
FIG. 5B illustrates another embodiment of an optical imaging system.

It is desirable that the free-space optical imaging system is image-space telecentric (zero chief ray angle), so that a single design of the free-space-to-waveguide optical antenna may be used for all FOV positions and the incident optical power received by the optical antenna is independent of the FOV. FIGS. 5A and 5B show two examples of compact wide-angle optical imaging systems. In FIG. 5A, the optical imaging system is implemented using bulk optics with 90° FOV. Optical imaging system 500 is illustrated to couple incident light from different fields 501, 502 and 503. An issue with this system may be its small aperture (e.g., in the order of 1 mm), which may limit the available radiant flux to be received. In fact, bulk optics-based wide-angle (fisheye) telecentric imaging systems may tend to have small apertures. These systems usually are also large (e.g., >40 mm in length for a 6×6 mm$^2$ sensor). Alternatively, the optical imaging system may be implemented using flat optics. For example, FIG. 5B depicts a Fresnel lens-based ultracompact landscape lens with a large FOV (e.g., 130°), very small system size, and improved aperture size. Optical imaging system 510 is illustrated to couple incident light from different fields 511, 512 and 513. In addition, metamaterial-based flat optics may be used, which offers the potential and flexibility in designing lenses with an ultra-thin form factor (e.g., ~1 µm), a very large FOV (e.g., >160° FOV), and a large numerical aperture.

Finally, the requirement of telecentricity may be relaxed by co-designing the free-space-to-waveguide optical antenna with the free-space optical imaging system. This may give a lot of freedom in designing the optics with a large aperture and a large FOV in a small form factor.

It should be noted that when the FOV is increased, a sensor chip with a larger pixel count may be needed in order to achieve a similar angular resolution. For example, a receiver array of 96×96 pixels may be able to achieve an angular resolution of 0.469°×0.469° over 45° FOV. With a pixel size of 25×25 µm$^2$, the overall receiver chip area may be about 2.4×2.4 mm$^2$. For a full 2π FOV, a receiver array of 384×384 pixels may be needed to achieve an angular resolution of 0.469°×0.469°. With a pixel size of 25×25 µm$^2$, the overall receiver chip area may be about 9.6×9.6 mm$^2$.

Communication Link Performance

Illustrative examples of the communication link performance of the disclosed embodiments are described in the following. It should be understood that the disclosed embodiments may be operated with different parameters that permit FSO communications at different regimes, including but not limited to different distances, communication data rates, and FOV.

The achievable data rate of the receiver under the influence of background radiation is related to the optical power received by the receiver. The optical power ($P_R$) received by the receiver due to atmospheric propagation effects and geometrical loss can be determined according to $$P_R = P_S \eta_R \frac{d_R^2}{D^2 \Delta \theta_{BeamDiv}^2} 10^{-\frac{\alpha D}{10}},$$

where $P_S$ is the optical power of the transmitted beam, $\eta_R$ is the receiver efficiency, $d_R$ is the receiver aperture, $D$ is the propagation distance, $\Delta \theta_{BeamDiv}$ is the beam divergence (in radians), and $\alpha$ is the atmospheric attenuation in dB/distance. FIG. 9B shows example parameters used for the calculations in FIGS. 6A-6D. It should be understood that other values for the parameters may be used.

Figure 6A:
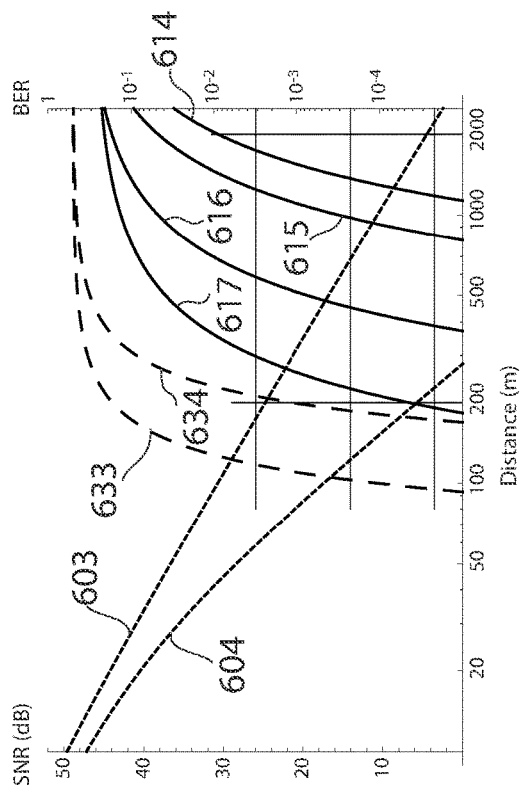
FIG. 6A illustrates example performances of the receiver of the present disclosure.
Figure 6B:
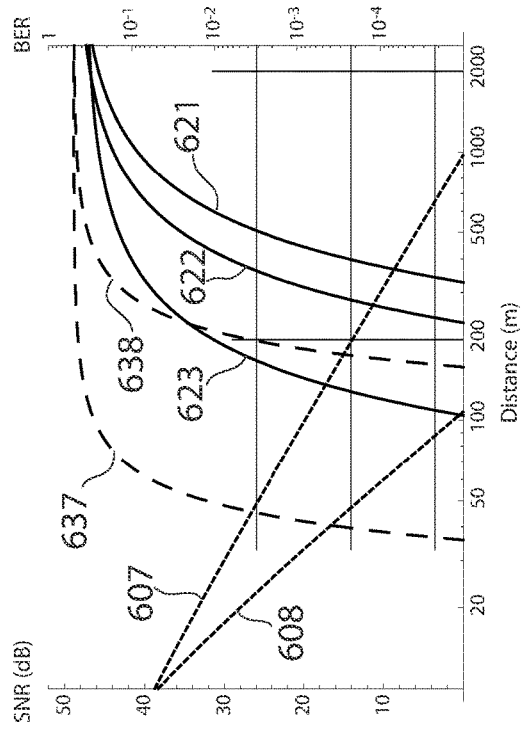
FIG. 6B illustrates another example performances of the receiver of the present disclosure.

FIGS. 6A and 6B show example plots of SNR (left axes of figures) of receiver 100 under the scenario of indirect reflection of sunlight from earth surface. This scenario may correspond to situations including, but not limited to, a flying drone receiving signals from a ground vehicle during day time. In FIG. 6A, line 601 shows an example SNR of coherent detection mode and line 602 shows an example SNR of direct detection mode, using the parameters in FIG. 9B with beam divergence set at 0.5° and aperture diameter of optical imaging system set at 3 mm. In FIG. 6B, line 603 shows an example SNR of coherent detection mode and line 604 shows an example SNR of direct detection mode using the parameters in FIG. 9B with beam divergence set at 0.352° and aperture diameter of optical imaging system set at 5 mm. It should be understood that other values for the parameters, beam divergence and aperture diameter may be used.

Figure 6C:
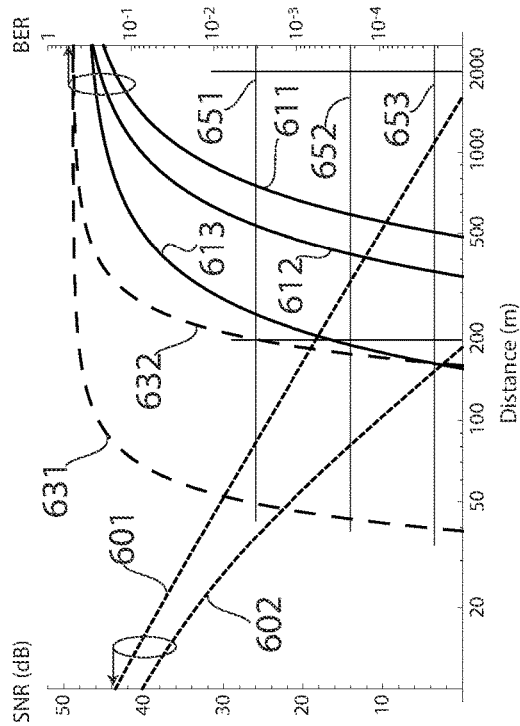
FIG. 6C illustrates further example performances of the receiver of the present disclosure.
Figure 6D:
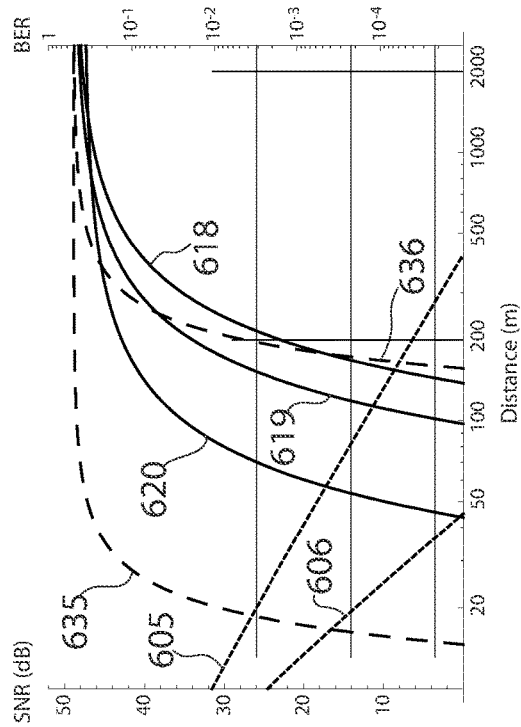
FIG. 6D illustrates yet further example performances of the receiver of the present disclosure.

FIGS. 6C and 6D show example plots of SNR (left axes of figures) of the receiver under the scenario of direct sunlight illumination. This scenario may correspond to situations including, but not limited to, a ground vehicle receiving signals from a drone flying above in a sunny day. In FIG. 6C, line 605 shows an example SNR of coherent detection mode and line 606 shows an example SNR of direct detection mode, using the parameters in FIG. 9B with beam divergence set at 0.5° and aperture diameter for optical imaging system set at 3 mm. In FIG. 6D, line 607 shows an example SNR of coherent detection mode and line 608 shows an example SNR of direct detection mode using the parameters in FIG. 9B with beam divergence set at 0.352° and aperture diameter for optical imaging system set at 5 mm. It should be understood that other values for the parameters, beam divergence, and aperture diameter may be used.

To evaluate the performance of digital communication, FIGS. 6A-6D also show the bit error rates (BER) of example modulation formats for coherent detection (binary phase-shift keying (BPSK) and quadrature amplitude modulation (m-QAM) with m=4, 16 and 64) and direct detection (non-return-to-zero on-off keying (NRZ OOK)). The BERs can be estimated according to the equations:

$$BER_{NRZ-OOK} = \frac{1}{2} Erfc\left(\frac{1}{2\sqrt{2}} \sqrt{SNR}\right),$$

$$BER_{BPSK} = \frac{1}{2} Erfc(\sqrt{SNR}),$$

$$BER_{m-QAM} \approx \frac{1}{2\log_2 m} Erfc\left(\frac{\sqrt{SNR}}{\sqrt{2(m-1)/3}}\right),$$

where Erfc(x) is the complementary error function. The electrical bandwidth may be taken to be the same as the symbol rate to achieve optimal performance. Example forward error correction (FEC) thresholds (KR4, KP4, BCH) are shown in FIGS. 6A-6D to indicate the achievable distances for the modulation schemes. Line 651 corresponds to BCH threshold, line 652 corresponds to KP4 threshold, and line 653 corresponds to KR4 threshold.

In FIG. 6A, line 611 corresponds to BER of BPSK, line 612 corresponds to BER of 4-QAM, line 613 corresponds to BER of 16-QAM, and line 631 corresponds to BER of NRZ OOK, all at symbol rates of 1 GSym/s. Line 632 corresponds to BER of NRZ OOK at a symbol rate of 4 MSym/s. In FIG. 6B, line 614 corresponds to BER of BPSK, line 615 corresponds to BER of 4-QAM, line 616 corresponds to BER of 16-QAM, line 617 corresponds to BER of 64-QAM, and line 633 corresponds to BER of NRZ OOK, all at symbol rates of 1 GSym/s. Line 634 corresponds to BER of NRZ OOK at a symbol rate of 0.1 GSym/s. In FIG. 6C, line 618 corresponds to BER of BPSK, line 619 corresponds to BER of 4-QAM, line 620 corresponds to BER of 16-QAM, and line 635 corresponds to BER of NRZ OOK, all at symbol rates of 1 GSym/s. Line 636 corresponds to BER of NRZ OOK at a symbol rate of 0.1 MSym/s. In FIG. 6D, line 621 corresponds to BER of BPSK, line 622 corresponds to BER of 4-QAM, line 623 corresponds to BER of 16-QAM, and line 637 corresponds to BER of NRZ OOK, all at symbol rates of 1 GSym/s. Line 638 corresponds to BER of NRZ OOK at a symbol rate of 3 MSym/s. It should be noted that symbol rate is the same as bit rate for BPSK and NRZ OOK.

In some aspect, the LO power used per pixel to attain shot-noise-limited detection may be as low as a few micro-Watts. In other aspects, the LO power per pixel to attain shot-noise-limited detection may be up to tens of milli-Watts. FIG. 6A demonstrates that, when the LO power per pixel is a few micro-Watts (such as about 10 µW), the receiver may still be able to achieve a high data rate (such as 4 Gbit/s) using modulation scheme (such as 16-QAM) at some achievable distance (such as 200 m) with example beam divergence of 0.5° and receiver aperture diameter of 3 mm. It also shows that direct detection generally may not achieve a similarly high data rate (e.g., 1 Gbit/s) because of a poorer SNR. To reach a similar achievable distance (such as 200 m), the bit rate of the NRZ OOK scheme may need to be substantially decreased to a lower value, such as about 4 Mbit/s.

In FIGS. 6A-6D, the optimal beam divergence for a 128×128 pixel array with 45° FOV is about 0.352°. As compared to FIG. 6A, FIG. 6B demonstrates that, by using an optimal beam divergence and a modest increase of receiver aperture (such as 5 mm), heterodyne detection with BPSK may reach a longer distance (e.g., more than 1.5 km at 1 Gbit/s) or a higher data rate at some achievable distance (e.g., 64-QAM at 8 Gbit/s for 200 m), whereas direct detection may reach a similar achievable distance (e.g., 200 m) at a higher data rate (e.g., 100 Mbit/s).

FIGS. 6C and 6D show the corresponding scenarios of FIGS. 6A and 6B under the condition of direct sunlight illumination on the receiver. Due to the strong noise background from sunlight, the SNR may be severely degraded. Coherent detection at LO power of a few micro-Watts may no longer be shot-noise-limited in the presence of background illumination. Nevertheless, the example analysis shows that, even when the LO power per pixel is a few micro-Watts (such as about 10 µW), the receiver may still be able to operate with BPSK at a high data rate (e.g., 1 Gbit/s) for some achievable distance (e.g., 200 m) with forward error correction (e.g., BCH FEC). A comparison between FIGS. 6A and 6C demonstrates that the receiver may have a large link margin (e.g., in excess of 10 dB for 200 m communication at 1 Gbit/s data rate) in the presence of harsh ambient conditions.

Pointing and Tracking (PAT) Mechanisms

Receiver 100 supports two pointing and tracking (PAT) mechanisms: (i) coherent detection mode PAT, and (ii) direct detection mode PAT, that may be used for different situations. Angle of arrival of optical signal for the PAT may be calculated according to the position of the receiver pixel of receiver pixel array 101 in receiver 100 that receives signals from the communication counterparty.

In coherent detection mode, the operation of PAT may be limited by (1) available LO signal power that may be supplied to the activated groups of receiver pixels, and (2) switching time of the photonic switches in optical routing network 104 and switching time of the optical switches in receiver pixel array 101 to route the LO signal.

For illustrative purpose, consider an embodiment of receiver pixel array 101 configured to have 16 pixels simultaneously activable to perform coherent detection. In some aspect, each receiver pixel of the pixel array may need about 10 µW LO power to achieve shot-noise-limited detection, and the LO signal may acquire an estimated loss of about 18 dB when it is routed from laser source 102 to the receiver pixels through optical routing network 104. Then an LO power may need to be at least 10 mW from laser source 102.

FIG. 7 shows an embodiment of receiver pixel array 101 that includes $M_1 \times M_2$ receiver pixel groups, where each receiver pixel group includes $K_1 \times K_2$ receiver pixels according to the embodiment in FIG. 3. In FIG. 7, a receiver pixel array with $M_1 = M_2 = 4$ and $K_1 = K_2 = 2$ is shown, with 16 receiver pixel groups 701, 702, 703, 704, 705, 706, 707, 708, 709, 710, 711, 712, 713, 714, 715 and 716, and 4 receiver pixels in each pixel group. For illustration simplicity, only optical switches of the receiver pixel groups with the corresponding electrical switches, control channels, and powerlines coupling the optical switches are shown in FIG. 7. Additionally, FIG. 7 shows a configuration in which pixel groups are joined using one LO waveguide for each column according to FIG. 4A. In FIG. 7, receiver pixel groups 701, 705, 709 and 713 share LO waveguide 741, receiver pixel groups 702, 706, 710 and 714 share LO waveguide 742, receiver pixel groups 703, 707, 711 and 715 share LO waveguide 743, and receiver pixel groups 704, 708, 712 and 716 share LO waveguide 744. Other configurations of joining pixel groups, including but not limited to the configuration of using multiple LO waveguides for each column as illustrated in FIG. 4B, may also be used. With two receiver pixel groups that can output readout signals simultaneously according to the embodiment in FIGS. 4A and 4B, each column of receiver pixel groups of the embodiment in FIG. 7 affords $2 \times K_1 \times K_2 = 8$ independent readout channels from $2 \times K_1 \times K_2 = 8$ receiver pixels in any two adjacent pixel groups of the column.

FIG. 7 shows an example configuration that permits any $P_1 \times P_2$ adjacent pixel groups within the $M_1 \times M_2$ pixel groups to be activated simultaneously with independently controllable power supplies to optical switches of the pixel groups. A pixel group may be activated when ON signals are applied to both the electrical switches in that pixel group through corresponding row and column control channels. In FIG. 7, $P_1 \times P_2 = 4$ adjacent pixel groups with $P_1 K_1 \times P_2 K_2 = 16$ adjacent pixels, where $P_1 = P_2 = K_1 = K_2 = 2$, may be activated simultaneously by row control channels 720, 721, 722 and 723, and column control channels 724, 725, 726 and 727. When a pixel group is activated by setting the electrical switches in the pixel group to ON states, powerlines 731, 732, 733, 734 and 735 may then supply electrical power to the optical switch of the activated pixel group. As an illustration, to activate pixel groups 707, 708, 711 and 712, ON signals are applied only to row control channels 721 and 722, and column control channels 726 and 727. On one hand, the ON signals in row control channels 721 and 722 may turn on electrical switches 781, 782, 783, 784, 785, 786, 787 and 788. On the other hand, the ON signals in column control channels 726 and 727 may turn on electrical switches 771, 772, 773, 774, 775, 776, 777 and 778. When voltages $V_1$, $V_2$, $V_3$, $V_4$ and $V_5$ are respectively applied to powerlines 731, 732, 733, 734 and 735, only optical switches 763, 764, 765 and 766 may conduct electrical currents. More specifically, if the voltage drops across the electrical switches are negligible, the voltage across the two terminals of optical switch 763 may be proportional to $V_2 - V_3$. Likewise, the voltage across optical switch 764 may be proportional to $V_2 - V_4$, the voltage across optical switch 765 may be proportional to $V_1 - V_3$, and the voltage across optical switch 766 may be proportional to $V_1 - V_5$. Thus, by applying appropriate voltages $V_1$, $V_2$, $V_3$, $V_4$ and $V_5$, optical switches 763 and 765 may respectively couple LO signal 743, if present, from waveguide 751 to pixel groups 707 and 711, and optical switches 764 and 766 may respectively couple LO signal 744, if present, from waveguide 752 to pixel groups 708 and 712. Additionally, the voltages across optical switches 763, 764, 765 and 766 may be independently controlled by voltages $V_1$, $V_2$, $V_3$, $V_4$ and $V_5$ to accommodate for possible different operating voltages of the optical switches. With the LO signals supplied to pixel groups 707, 708, 711 and 712, and pixel electronic circuits of the receiver pixels in these pixel groups set to coherent detection mode of operation, the receiver pixels in these pixel groups may then be able to carry out coherent detection for the optical signal that is coupled to one or more of the receiver pixels of these pixel groups. It should be remarked that, in addition to the electrical switches that are coupled to the optical switches as illustrated in FIG. 7, the row and column control channels may also control the electrical switches that are coupled to other components such as photodetectors 304 and pixel electronic circuits 305 not displayed in FIG. 7.

FIGS. 8A-8E illustrate the PAT mechanism with receiver 100 in the coherent detection mode. The advantage of this topology includes establishing a simultaneous continuous tracking and communication link with the communication counterparty. This topology enables the PAT mechanism to reduce the odd of missing the communication counterparty by keeping the counterparty located within the FOV of receiver 100 corresponding to the inner pixels of a plurality of pixel groups.

Figure 8A:
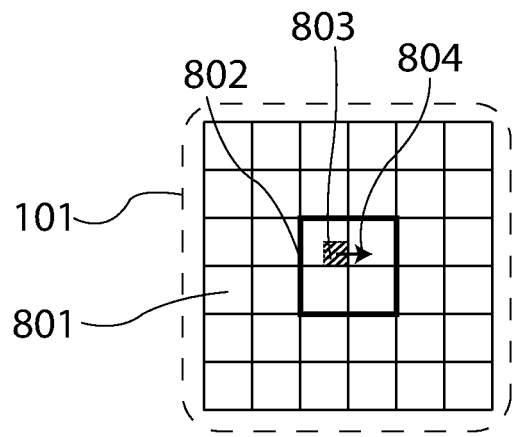
FIG. 8A-8E illustrate tracking mechanisms with the receiver of the present disclosure in the coherent detection mode of operation.

As an example, FIG. 8A shows an embodiment of receiver pixel array 101 of receiver 100 with $M_1 \times M_2$ receiver pixel groups 801, and each receiver pixel group 801 including $K_1 \times K_2$ receiver pixels, where $M_1 = M_2 = 6$ and $K_1 = K_2 = 2$. Thus receiver pixel array 101 illustrated in FIG. 8A includes $M_1 K_1 \times M_2 K_2 = 12 \times 12$ receiver pixels. According to some embodiments, receiver pixel group 801 may be a pixel group 300 as illustrated in FIG. 3. Following the configuration of pixel groups that are joined according to the embodiment in FIG. 7, a receiver pixel super-group 802 may be formed by 2×2 adjacent receiver pixel groups, with the receiver pixels within receiver pixel super-group 802 to be simultaneously activated. That is, all $2K_1 \times 2K_2$ receiver pixels with $K_1 = K_2 = 2$ within receiver pixel super-group 802 are supplied with LO signals and are connected to $2K_1 \times 2K_2 = 16$ independent readout channels.

Figure 8F:
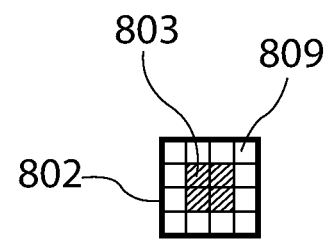
FIG. 8F illustrates an embodiment of the inner and outer receiver pixels of a receiver pixel supergroup.

According to the PAT scheme illustrated in FIG. 8A, optical signal from the communication counterparty is detected at an FOV of receiver 100 corresponding to receiver pixel 803, where receiver pixel 803 is one of the inner receiver pixels of receiver pixel super-group 802. In FIG. 8A, there are 4 inner receiver pixels and 12 outer receiver pixels in receiver pixel super-group 802. More explicitly, FIG. 8F illustrates the inner and outer receiver pixels of receiver pixel super-group 802. In FIG. 8F, receiver pixel 803 is one of the 4 inner pixels and receiver pixels 809 is one of the 12 outer pixels.

Figure 8B:
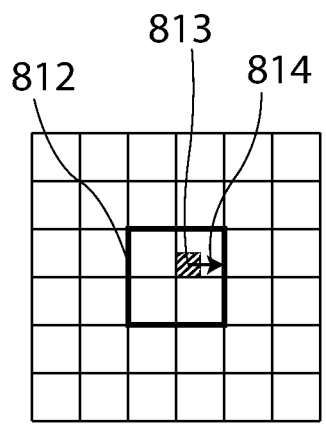
Figure 8C:
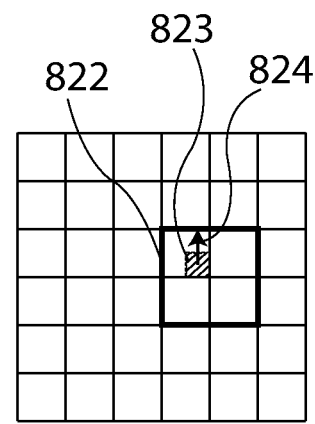
Figure 8D:
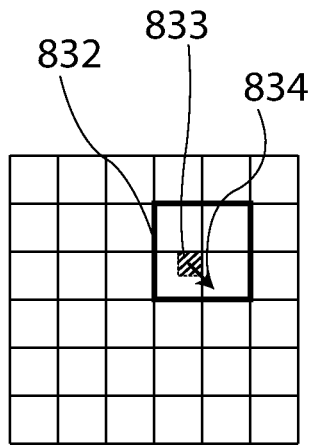
Figure 8E:
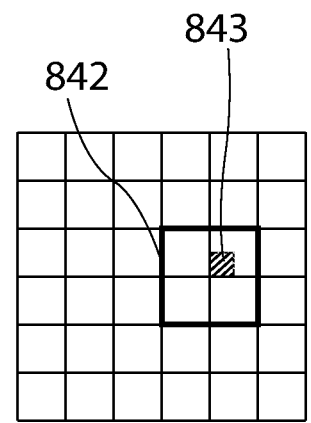

The communication counterparty may be in relative motion along a lateral direction with respect to receiver 100. In FIG. 8A, the communication counterparty moves along direction 804. As the counterparty moves according to direction 804, it may then fall into an FOV of receiver 100 corresponding to receiver pixel 813 as illustrated in FIG. 8B. In FIG. 8B, since the counterparty still resides in an FOV corresponding to an inner receiver pixels of receiver pixel super-group 812, super-group 802 is kept to be the same as super-group 802. As the counterparty moves according to direction 814, it may then fall into an FOV of receiver 100 corresponding to receiver pixel 823 as illustrated in FIG. 8C. Now receiver pixel 823 in FIG. 8C is one of the 12 outer receiver pixels of super-group 812 in FIG. 8B. Thus super-group 822 in FIG. 8C is updated to include pixel groups such that receiver pixel 823 may remain as one of the 4 inner receiver pixels of super-group 822. Similarly, as the counterparty moves according to direction 824, it may then fall into an FOV of receiver 100 corresponding to receiver pixel 833 as illustrated in FIG. 8D. Super-group 832 in FIG. 8D is updated to include pixel groups such that receiver pixel 833 may remain as one of the 4 inner receiver pixels of super-group 832. Similarly, as the counterparty moves according to direction 834, it may then fall into an FOV of receiver 100 corresponding to receiver pixel 843 as illustrated in FIG. 8E. Super-group 842 in FIG. 8E is updated to include pixel groups such that receiver pixel 843 may remain as one of the 4 inner receiver pixels of super-group 842. In view of FIGS. 8A-8E, after each update of the receiver pixel super-group to keep track of the motion of the communication counterparty, at least two of the receiver pixel groups of the super-group are retained. Also, by keeping the optical signal from the communication counterparty being received within the FOV of receiver 100 corresponding to the inner pixels of the super-group, communication link with the counterparty may be maintained even the counterparty is in relative motion with respect to receiver 100. In the event when the counterparty moves beyond the FOV corresponding to the pixels of the super-group, a re-establishment of tracking of the counterparty may be needed.

According to the embodiment in FIGS. 8A-8E, the communication counterparty resides in one of the inner receiver pixels of the super-groups. According to other embodiments, the communication counterparty may reside in the FOV of receiver 100 corresponding to more than one of the inner receiver pixels of the super-groups. These receiver pixels may output signals simultaneously to signal readout electronics 105 of receiver 100. The angle of arrival of the optical signal from the communication counterparty may be calculated from the average position of the receiver pixels that receive optical signal from the counterparty. The average position may be calculated with or without weightings with respect to the optical signal strengths received at the receiver pixels. With the angle of arrival of the optical signal known, transmitter 110 may be set to send out optical signal to the communication counterparty by steering (e.g., pointing) the laser beam accordingly.

The PAT mechanism in FIGS. 8A-8E may require the communication counterparty to be located and tracked at the beginning. To establish an initial tracking with an unknown location of the counterparty or to re-establish tracking of the counterparty if the tracking is lost during communication, receiver 100 may need to scan the receiver pixels (e.g., all available FOV positions of receiver 100). For an $N_1 \times N_2$ pixel array with $P_1 \times P_2$ pixel groups that may be activated simultaneously and each pixel group including $K_1 \times K_2$ pixels, a single pass by the coherent detection mode to scan the entire FOV may take a duration proportional to $(N_1/P_1K_1) \times (N_2/P_2K_2)T_{SW}$, where $T_{SW}$ is the response time of photonic switches in receiver 100. According to some embodiments where the photonic switches are thermo-optical switches, the response time ($T_{SW}$) may take less than a few hundred microseconds to ensure that the switch is stabilized (e.g., outside the transient regime) for optical coupling. According to other embodiments where the photonic switches are electro-optical switches, the response time ($T_{SW}$) may take less than a few hundred nanoseconds. It should be remarked that, if the counterparty does not know the location of the receiver (no side channel is provided), the counterparty may also need to scan its optical beam over its FOV to ensure the receiver catching the optical signal.

In direct detection mode PAT, the LO is not used. Thus there is no constraint in LO power or routing the LO. According to FIGS. 3, 4A, 4B, and 7, the topology of the receiver pixel array enables highly parallelized electrical readout. According to some embodiments, based on the parallelized electrical readout, the direct detection mode PAT mechanism may scan the entire FOV by scanning the pixel array row by row of the configuration illustrated in FIG. 7, in a fashion similar to a rolling shutter CMOS image sensor. Since $P_1$ pixel groups in each column of FIG. 7 have separate readout channels, the scanning time for the entire FOV is proportional to $(N_1/P_1K_1)T_{RW}$, where $T_{RW}$ is the time needed to scan $P_1$ rows of pixel groups.

The switching of electronics is much faster than the switching of photonics. The operation of the direct detection mode PAT mechanism may instead be limited by the shorter achievable detection distance and the lower data rate.

As an illustration, consider tracking a communication counterparty at a distance of 200 m and the example of the receiver performance according to FIG. 6A. Assume a switching time $T_{SW}$=100 μs of the optical switch. For a 128×128 pixel array receiver with concurrent activable number of pixel groups $P_1$=$P_2$=2, and number of pixels in a pixel group $K_1$=$K_2$=2, the scanning time for the entire FOV using the coherent detection mode PAT may be about 100 ms. On the other hand, consider an achievable data rate of 4 Mbps for direct detection and a communication link that may require 256 bits for handshaking, the corresponding full FOV scanning time using the direct detection mode PAT may be estimated to be (128/4)×(256 bits/4 Mbps)=2 ms, which is 50 times faster than the coherent detection mode PAT mechanism. It should be understood that the analysis above is for illustrative purposes. Other switching parameters may be used and other switching times for the coherent detection mode PAT and direct detection mode PAT may be possible.

Power Budget Analysis

Power consumption of receiver 100 comes from (1) laser for LO, and (2) electrical power for receiver chip operation. The following gives illustrative examples for the LO laser power and electrical power for the operations of the disclosed embodiments. It should be understood that other parameters and power consumptions for the operation of the receiver may be possible.

Laser Power for LO

In the coherent detection mode of the receiver, a LO is needed for coherent detection. The LO is supplied through laser source 102 that may be integrated with the receiver chip, or coupled externally through a fiber coupler. In either case, a coupling loss of 2 to 3 dB may be common. After coupling to the chip, the LO is routed through optical routing network 104. The coupling loss of an MZM-based switch may be typically less than 1 dB per switch. For an $N_1 \times N_2$ pixel array receiver with $P_1 \times P_2$ pixel groups operating simultaneously and each pixel group including $K_1 \times K_2$ pixels, to deliver the LO to any $P_2$ columns of pixel groups of the receiver array, the number of simultaneously operating MZM-based switches of the optical routing network scales in $\log_2 N_2$. The insertion loss of an optical switch in a pixel group may be typically about 1.5 dB. Finally, the propagation loss of a TE-polarized fundamental mode in silicon waveguide may be about 2 dB/cm. Therefore, the total optical loss of the LO can be approximated by $$\text{loss} \approx (3 + 1 \times \log_2 N_2 + 1.5 P_1 \times P_2 + 2) \text{ dB}.$$

For $N_1=N_2=128$, $P_1=P_2=2$ and $K_1=K_2=2$, the LO loss can be estimated to be about 18 dB. Assuming $(P_1K_2)\times(P_1K_2)=16$ pixels are in operation and each pixel may need LO power of 10 μW, the LO laser supply may need to be about 10 mW.

Electrical Power Budget

The main power consumption of the receiver may include operating the photonic switches in optical routing network 104, optical switches in receiver pixel array 101, the drivers for the switches by control electronics 103, pixel electronic circuits within the receiver pixels of receiver pixel array 101, and readout electronic circuit 105 of receiver 100. The total power consumption for coherent detection (communication and PAT) with a receiver pixel super-group of $P_1 \times P_2$ pixel groups can be estimated by $$W_{coh} \approx (\log_2 N_2) W_{MZM} + (P_1 \times P_2) W_{Ring} + (\log_2 N_2 + P_1 \times P_2) W_{Driver} + (P_1 K_1 \times P_2 K_2) W_{TIA} + W_{ROC},$$

and the total power consumption for direct detection mode PAT to scan $P_1$ row of pixel groups can be estimated to be $$W_{dir} \approx (N_2 P_1 K_1) W_{TIA} + (N_2/P_2 K_2) W_{ROC},$$

where $W_{MZM}$, $W_{Ring}$, $W_{Driver}$, $W_{TIA}$, and $W_{ROC}$ are respectively the power usages of a photonic switch in optical routing network 104, an optical switch 309 in receiver pixel array 101, photonic switch driver in control electronics 103, a pixel electronic circuit 305 in receiver pixel array 101, and signal readout electronics 105 to control electrical switches and receive electrical readout signals in a receiver pixel super-group. Using example values for illustration with $W_{MZM}=W_{Ring}=20$ mW, $W_{Driver}=2$ mW, $W_{TIA}=1$ mW, and $W_{ROC}=200$ mW, and $N_1=N_2=128$, $P_1=P_2=K_1=K_2=2$ for the receiver design, the electrical power usages can be estimated to be $W_{coh} \approx 450$ mW and $W_{dir} \approx 7000$ mW.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed modified by a term of degree (e.g., "about"), thereby reflecting its intrinsic uncertainty.

Although various embodiments of the present disclosure have been described in detailed herein, one of ordinary skill in the art would readily appreciate modifications and other embodiments without departing from the spirit and scope of the present disclosure as stated in the appended claims.

What is claimed is:

1. A receiver for free-space optical communication configured to operate between coherent and direct detection modes, comprising:
    a local oscillator light source configured to generate a local oscillator signal;
    an optical routing network coupling to said local oscillator light source;
    a receiver pixel array coupling to said optical routing network, wherein said receiver pixel array comprises a plurality of receiver pixels, each of said receiver pixels comprises:
        a free-space-to-waveguide optical antenna;
        an optical coupler with one of its input ports coupling to said free-space-to-waveguide optical antenna;
        at least two photodetectors coupling to output ports of said optical coupler; and
        a pixel electronic circuit configured to receive and process electrical outputs from said photodetectors; and
    a signal readout electronic circuit configured to switch said pixel electronic circuits in receiver pixels of said receiver pixel array between coherent detection mode and direct detection mode, and to receive electrical readout signals from said pixel electronic circuits;
    wherein, in operation, said receiver pixel array is configured to select one or more receiver pixels to receive an optical signal from free space through one or more free-space-to-waveguide optical antennas of said selected receiver pixels;
    wherein when said receiver is configured to operate in the coherent detection mode, said optical routing network is configured to route said local oscillator signal from said local oscillator light source to said selected receiver pixels of said receiver pixel array; said selected receiver pixels are configured to couple said local oscillator signal into the pixels; optical couplers of said selected receiver pixel mix said local oscillator signal and said received optical signal; said optical couplers split said mixed local oscillator and received optical signals; said split signals are detected by photodetectors coupling to said optical couplers in said selected receiver pixels; pixel electronic circuits of said selected receiver pixels are switched to operate in the coherent detection mode by said signal readout electronic circuit to receive and process electrical outputs from said photodetectors; and said pixel electronic circuits output electrical readout signals to said signal readout electronic circuit; and
    wherein when said receiver is configured to operate in the direct detection mode, said selected receiver pixels are configured to decouple from said local oscillator signal; optical couplers of said selected receiver pixels split said received optical signal without mixing with said local oscillator signal due to the absence of said local oscillator signal in said selected receiver pixels; said split received optical signals are detected by photodetectors coupling to said optical couplers in said selected receiver pixels; pixel electronic circuits of said selected receiver pixels are switched to operate in the direct detection mode by said signal readout electronic circuit to receive and process electrical outputs from said photodetectors; and said pixel electronic circuits output electrical readout signals to said signal readout electronic circuit.

2. The receiver for free-space optical communication in claim 1, wherein said pixel electronic circuit switched to operate in the coherent detection mode processes electrical outputs from said photodetectors by taking a difference of said electrical outputs to produce said electrical readout signal.

3. The receiver for free-space optical communication in claim 1, wherein said pixel electronic circuit switched to operate in the direct detection mode processes electrical outputs from said photodetectors by taking a sum of said electrical outputs to produce said electrical readout signal.

4. The receiver for free-space optical communication in claim 1, further comprising a control electronic circuit configured to control the routing of said local oscillator signal in said optical routing network.

5. The receiver for free-space optical communication in claim 1, wherein when said receiver is configured to operate in the direct detection mode, said selected receiver pixels are configured to decouple from said local oscillator signal by configuring said optical routing network to route said local oscillator signal away from said selected receiver pixels of said receiver pixel array.

6. The receiver for free-space optical communication in claim 1, wherein said receiver pixel array of said receiver further comprises a plurality of optical switches, and said receiver pixel array is partitioned into a plurality of groups of receiver pixels comprising one or more receiver pixels, with each said group of receiver pixels configured to couple said local oscillator signal into receiver pixels of said group through one of said optical switches.

7. The receiver for free-space optical communication in claim 6, wherein two or more said groups of receiver pixels are configured to share a common waveguide to receive said local oscillator signal from said optical routing network.

8. The receiver for free-space optical communication in claim 6, wherein each said group of receiver pixels further comprises a plurality of readout channels, such that each receiver pixel in each said group is configured to output electrical readout signal to said signal readout electronic circuit independently of other receiver pixels in said group through a readout channel of said plurality of readout channels.

9. The receiver for free-space optical communication in claim 8, wherein said receiver pixel array is partitioned into a plurality of clusters of groups of receiver pixels, wherein each said cluster comprises two or more groups of receiver pixels, with the groups of said cluster configured to share said plurality of readout channels to multiplex electrical readout signals from said groups such that, at any moment, receiver pixels of only one of said groups of receiver pixels of said cluster are configured to output electrical readout signals to said signal readout electronic circuit through said shared readout channels.

10. A device for free-space optical communication comprising the receiver of claim 1 and an optical imaging system coupling with the receiver pixel array of said receiver.

11. The device for free-space optical communication in claim 10, further comprising a micro-lens array coupling with said optical imaging system and said receiver pixel array.

12. A method for free-space optical communication switchable between coherent detection mode and direct detection mode, comprising:
generating a local oscillator signal from a local oscillator light source;
selecting a plurality of receiver pixels from a receiver pixel array;
receiving an optical signal from free space by at least one receiver pixel in said selected plurality of receiver pixels;
in the coherent detection mode, performing the steps of
routing said local oscillator signal to said selected plurality of receiver pixels through an optical routing network;
coupling said local oscillator signal into said selected plurality of receiver pixels;
mixing said local oscillator signal and said optical signal in said selected receiver pixel that receives said optical signal;
splitting said mixed local oscillator and optical signals;
detecting said split signals by photodetectors;
switching a pixel electronic circuit of said selected receiver pixel to coherent detection mode;
processing electrical outputs from said photodetectors by said pixel electronic circuit to produce an electrical readout signal; and
outputting said electrical readout signal to a signal readout electronic circuit; and
in the direct detection mode, performing the steps of
decoupling said local oscillator signal from said selected plurality of receiver pixels;
splitting said optical signal without mixing with said local oscillator signal due to the absence of said local oscillator signal in said selected receiver pixel that receives said optical signal;
detecting said split optical signals by photodetectors;
switching a pixel electronic circuit of said selected receiver pixel to direct detection mode;
processing electrical outputs from said photodetectors by said pixel electronic circuit to produce an electrical readout signal; and
outputting said electrical readout signal to a signal readout electronic circuit.

13. The method for free-space optical communication in claim 12, wherein in the coherent detection mode, the step of processing electrical outputs from said photodetectors comprises taking a difference of said electrical outputs to produce said electrical readout signal.

14. The method for free-space optical communication in claim 12, wherein in the direct detection mode, the step of processing electrical outputs from said photodetectors comprises taking a sum of said electrical outputs to produce said electrical readout signal.

15. The method for free-space optical communication in claim 12, wherein in the direct detection mode, the step of decoupling said local oscillator signal comprises configuring an optical routing network to route said local oscillator signal away from said selected plurality of receiver pixels.

16. The method for free-space optical communication in claim 12, wherein the step of receiving an optical signal from free space comprises collecting said optical signal through an optical imaging system.

17. The method for free-space optical communication in claim 16, further comprising calculating an angle of arrival of said optical signal according to a location of said selected receiver pixel that receives said optical signal with respect to a field of view of said optical imaging system.

18. The method for free-space optical communication in claim 17, further comprising tracking a change of the angle of arrival of said optical signal.

19. The method for free-space optical communication in claim 12, further comprising maintaining said receiver pixel that receives said optical signal to lie within a group of inner pixels of said selected plurality of receiver pixels.

20. The method for free-space optical communication in claim 19, further comprising updating said selected plurality of receiver pixels to maintain said receiver pixel that receives said optical signal to lie within a group of inner pixels of said selected plurality of receiver pixels.

* * * * *